United States Patent
Hsu et al.

(10) Patent No.: US 7,252,424 B2
(45) Date of Patent: Aug. 7, 2007

(54) BACKLIGHT MODULE CAPABLE OF INTERCHANGING POLARIZED STATES OF LIGHT

(75) Inventors: Shih-Chia Hsu, Kaohsiung (TW); Jyh-Haur Huang, Pingtung Hsien (TW)

(73) Assignee: AU Optronics Corp., Hsinchu (TW)

( * ) Notice: Subject to any disclaimer, the term of this patent is extended or adjusted under 35 U.S.C. 154(b) by 147 days.

(21) Appl. No.: 11/137,381

(22) Filed: May 26, 2005

(65) Prior Publication Data

US 2006/0007700 A1    Jan. 12, 2006

(30) Foreign Application Priority Data

Jul. 6, 2004    (TW) .............................. 93120247 A

(51) Int. Cl.
*F21V 8/00* (2006.01)
*F21V 7/04* (2006.01)
*G02B 6/10* (2006.01)

(52) U.S. Cl. ...................... 362/600; 349/62; 385/146; 362/558

(58) Field of Classification Search ............... 362/600, 362/558; 385/146; 349/62
See application file for complete search history.

(56) References Cited

U.S. PATENT DOCUMENTS

| | | | | |
|---|---|---|---|---|
| 4,798,448 A * | 1/1989 | van Raalte | ..................... | 349/62 |
| 5,986,730 A | 11/1999 | Hansen et al. | ................. | 349/96 |
| 6,081,376 A | 6/2000 | Hansen et al. | ............... | 359/485 |
| 6,108,131 A | 8/2000 | Hansen | ........................ | 359/486 |
| 6,122,103 A | 9/2000 | Perkins et al. | ............... | 359/486 |
| 6,208,463 B1 | 3/2001 | Hansen et al. | ............... | 359/486 |
| 6,234,634 B1 | 5/2001 | Hansen et al. | ................. | 353/20 |
| 6,243,199 B1 | 6/2001 | Hansen et al. | ............... | 359/486 |
| 6,288,840 B1 | 9/2001 | Hansen et al. | ............... | 359/486 |
| 6,335,999 B1 * | 1/2002 | Winston et al. | ............. | 385/146 |
| 6,348,995 B1 | 2/2002 | Hansen et al. | ............... | 359/486 |
| 6,447,120 B1 | 9/2002 | Hansen et al. | ................. | 353/20 |
| 6,452,724 B1 | 9/2002 | Hansen et al. | ............... | 359/486 |
| 6,671,452 B2 * | 12/2003 | Winston et al. | ............. | 385/146 |

FOREIGN PATENT DOCUMENTS

| | | |
|---|---|---|
| CN | 1138379 A | 12/1996 |
| CN | 1306626 A | 8/2001 |

(Continued)

*Primary Examiner*—Sandra O'Shea
*Assistant Examiner*—James W Cranson, Jr.
(74) *Attorney, Agent, or Firm*—Troxell Law Office, PLLC

(57) ABSTRACT

The provided backlight module includes a reflection sheet, a retardation plate, a light-guide plate, a light source, and a sub-wavelength grating plate. The retardation plate is set over the reflection sheet. The light-guide plate is disposed over the retardation plate, and the surface of the light-guide plate comprises a plurality of micro-structures. The light source is set beside the light-guide plate, and the light from the light source transferring into the light-guide plate passes through one of its end and out through the micro-structures. The sub-wavelength grating plate is disposed over the light-guide plate: (i) to transmit light having a polarization oriented parallel to the rows of bars and to define a transmitted light, corresponding to the light, as P-ray, and (ii) to reflect light having a polarization oriented perpendicular to the rows of bars and to define a reflected light, corresponding to the light, as S-ray.

23 Claims, 4 Drawing Sheets

FOREIGN PATENT DOCUMENTS

| | | |
|---|---|---|
| CN | 1084483 C | 5/2002 |
| CN | 1192254 C | 3/2005 |
| TW | 528895 | 4/2003 |
| TW | 544501 | 8/2003 |
| TW | 547670 | 8/2003 |

* cited by examiner

BACKLIGHT MODULE CAPABLE OF INTERCHANGING POLARIZED STATES OF LIGHT

BACKGROUND OF THE INVENTION (1) Field of the Invention

The present invention generally relates to a backlight module and particularly relates to a backlight module which is capable of interchanging polarized states of light.

(2) Description of the Related Art

Please referring to FIG. 1, FIG. 1 generally shows a cross-section view of a liquid crystal display (LCD). An LCD 10 includes a liquid crystal panel 12 and a backlight module 14. The backlight module 14 provides lights to the liquid crystal panel 12.

Liquid crystal panel 12 includes an upper polarizer 124, a color filter 121, a liquid crystal layer 122, a thin film transistor (TFT) substrate 123 and a bottom polarizer 125. The TFT substrate 123 comprises a plurality of pixel electrodes for controlling the twist angles of liquid crystal molecules 16 of the liquid crystal layer 122. Hence, transparency of a polarized light beam coming from the bottom polarizer 125 could be modulated by the liquid crystal layer 122, so as to display gray level images. Through the color filter 121, the LCD 10 gives out images with color.

Controlling the twist angles of liquid crystal molecules 16 to modulate the transparency of light is an essential technique of the related arts. As shown in FIG. 1, the oval-shaped liquid crystal molecules 16 have bilateral effect to light. Light which is going to be modulated by the liquid crystal layer 122 must be polarized in advance. Thus, the conventional LCD 10 requires one or a plurality of polarizers, e.g. upper polarizer 124 and bottom polarizer 125 shown in FIG. 1, to polarize the light from the backlight module 14. In some of other related arts, as shown in FIG. 2, a polarizer 145 may disposed within the backlight module 14 for replacing the bottom polarizer 125 shown in FIG. 1.

FIG. 2 shows a cross section view of a conventional backlight module. The backlight module 14 comprises a lamp 141, a light-guide plate 142, a reflection plate 143, a polarizer 145 and a plurality of optical films 147.

The lamp 141 is disposed at one side of the light-guide plate 142, therefore, the backlight module 14 is called an edge-light type backlight module. The lamp 141 may be a cold cathode fluorescence lamp (CCFL). The light-utilizing efficiency of the edge-light type backlight module 14 is generally less than another backlight module, a direct type backlight module (not shown), which is usually used in some larger-sized LCDs.

The light-guide plate 142 has an inclined plane 1421 at the side near the lamp 141, and there is a plurality of slot structures 1422 disposed at the bottom surface of the light-guide plate 142.

As shown in FIG. 2., density of the slot structures 1422 increases from the side adjacent to the lamp 141 to another side far away from the lamp 141. This avoids the light-guide plate 142 having particularly higher brightness adjacent to the lamp 141 than that far away from the lamp 141, and makes the light evenly emit from the light-guide plate 142. The reflection plate 143, disposed below the light-guide plate 142, reflects the light from the bottom surface of the light-guide plate 142 and enlarges the light-utilizing efficiency.

In backlight module 14, in order to enhance optical performance, the light generated from the lamp 141 passes through many devices described above to provide an uniform backlight source to the liquid crystal panel 12 shown in FIG. 1. As a result, the amount of the light provided to the liquid crystal panel 12 is usually less than 8% of the total amount of the light generated from the lamp 141. So the low light-utilizing efficiency becomes a particularly serious problem in edge-light type backlight module 14.

Among all devices in LCD 10, the polarizer 145, the upper polarizer 124 or the bottom polarizer 125 causes huge light loss. Generally, 50% of the total amount of the light is P-ray and the other 50% is S-ray. While light passes through a polarizer 145, 124 or 125, S-ray is absorbed and therefore 50% of the total amount of the light is lost.

A method of making polarizer 145, 124 or 125 and the functions of it are described below. First, specific molecules with long side-chain are disposed in a plastic film, which may be transparent. Then the plastic film is elongated by corresponding tension force. Thus, the side-chain of the molecules might be arranged alongside the direction of the tension force. The polarizer 145, 124 or 125 may absorb light, S-ray, having a polarization oriented perpendicular to the long axis of said molecules, only light, P-ray, having a polarization oriented parallel to the long axis of said molecules may be transmitted through polarizer 145, 124 or 125. Hence, 50% of light is lost when it passes through the polarizer 145, 124 or 125.

Thus, the related art lacks the way of utilizing the absorbed S-ray. Therefore, a backlight module which is capable of utilizing light more effectively is needed. Besides, considering the production line, cost and convenience of making the present provided backlight module is another important issue. As a matter of fact, all the R&D staffs in the related field of LCD development are dedicated in resolving the lacking of related art in hoping to increase the efficiency and quality of light provided by the backlight module.

SUMMARY OF THE INVENTION

Accordingly, one object of the present invention is to provide a backlight module, which is capable of interchanging the polarized states of light.

Another object of the present invention is to improve the drawback of low light-utilizing efficiency of related backlight module.

In addition, it is a further object of the present invention to provide a backlight module which is easy to produce.

The backlight module provided by the present invention includes a reflection sheet, a retardation plate, a light-guide plate, a light source, a sub-wavelength grating plate and a plurality of optical films.

Retardation plate, which may be a combination of one ½ wave plate and one ¼ wave plate, is disposed over the reflection sheet; through the cooperation of ½ wave plate and ¼ wave plate, the visible light can generate a ½ wave-length phase difference evenly by passing through the ½ wave plate and the ¼ wave plate twice.

Likely, light-guide plate may be disposed over the retardation plate, wherein the surface of the light-guide plate has a plurality of micro-structures so as to increase the uniformity of the backlight module. The light source is disposed adjacent to one side of the light-guide plate, the light that emits from it may be total internal reflected inside the light-guide plate. Through the micro-structures on the surface of light-guide plate, the light is thus able to emits out of the light-guide plate.

Sub-wavelength grating plate is equipped with a plurality of bars, which may be arranged in a spatial period from about 10 nanometer to 100 nanometer, as:
(i) to transmit light having a polarization oriented parallel to the plurality of bars and to define the corresponding transmitted light as P-ray; and
(ii) to reflect light having a polarization oriented perpendicular to the plurality of bars and to define the corresponding reflected light as S-ray.

The S-ray may be reflected by the reflection sheet at the bottom of the backlight module, and then it is reflected from sub-wavelength grating plate to the reflection sheet. After that, it would be re-reflected back to sub-wavelength grating plate. Through this process, the S-ray passes through retardation plate back and forth; in turn, generates a retardation of ½ wavelength which ultimately transform the S-ray into P-ray which can penetrate sub-wavelength grating plate. Through the combination of sub-wavelength, retardation plate and reflection sheet, the non-polarized light provided by light source may be transformed into P-ray, nearly perfectly.

The present invention provides a backlight module that is capable of interchanging polarized states of lights; and in turn improves the low light-utilizing efficiency. By operating the sub-wavelength grating plate in coordination with retardation plate and reflection sheets, the invention successfully makes use of the supposed-to-be-absorbed S-ray. The light generated from the light source is thus being employed more effectively. In addition, disposing the ½ wave plate has enable S-ray to transform evenly into P-ray in the range of visible lights. The present invention also provides a backlight module which is easier to make than related art. Therefore the present invention is able to adapt on production line immediately.

BRIEF DESCRIPTION OF THE DRAWINGS

The present invention will now be specified with reference to its preferred embodiments illustrated in the drawings, in which.

DESCRIPTION OF THE PREFERRED EMBODIMENT

Figure 3:
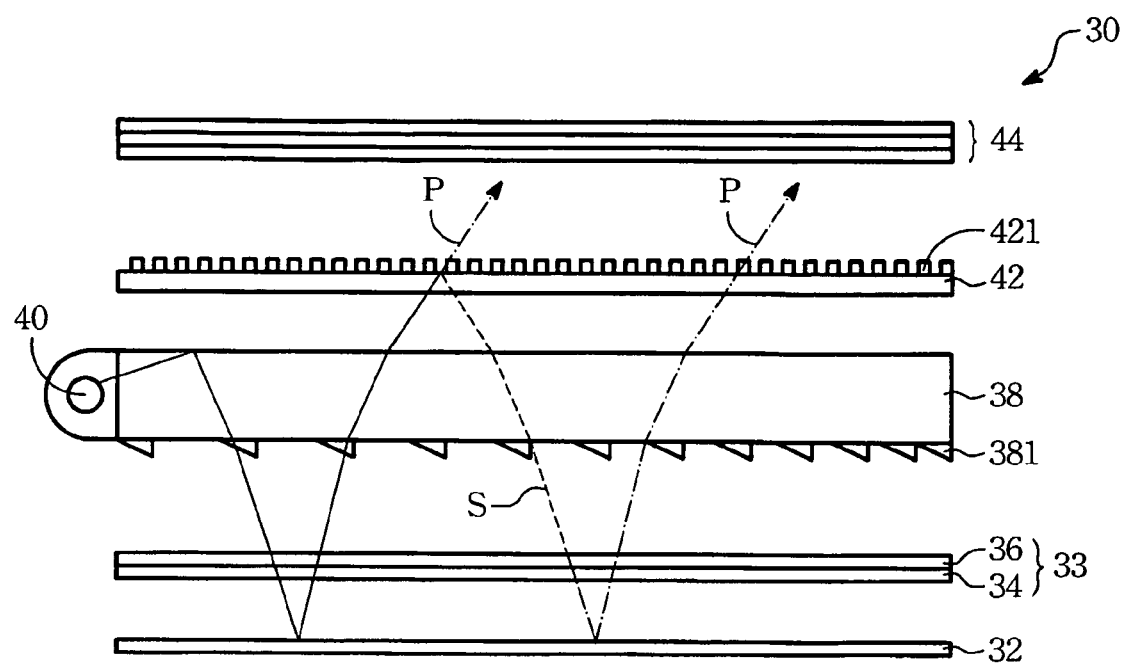
FIG. 3 is an illustration of a backlight module according to the present invention.

Referring to FIG. 3, it illustrates the backlight module according to the present invention. Backlight module 30, which includes a reflection sheet 32, a retardation plate 33, a light-guide plate 38, a light source 40, a sub-wavelength grating plate 42 and a plurality of optical films 44, is capable of interchanging polarized states of lights.

Retardation plate 33, which is a combination of one ¼ wave plate 34 and one ½ wave plate 36 in one embodiment of the present invention, is disposed over the reflection sheet 32.

Light-guide plate 38 is placed over the retardation plate 33. The surface of light-guide plate 38 has a plurality of micro-structures 381; and each micro-structure 381 has a particular inclined surface.

The light source 40, which is disposed adjacent to one side of the light-guide plate 38, generates a generally unpolarized light propagated in the light-guide plate 38 through total internal reflection and leaving the light-guide plate 38 through the micro-structures 381.

As shown in FIG. 3, the density of micro-structures 381 increases from the side adjacent to light source 40 to another side far away from light source 40. This is to avoid unevenness lighting which may occur due to light cluster at the side next to light source 40 (left side in FIG. 3).

Sub-wavelength grating plate 42 is disposed over the light-guide plate 38. Sub-wavelength grating plate 42 has a plurality of bars 421, which are arranged in a spatial period from about 10 nanometer to 100 nanometer, as:
(i) to transmit light having a polarization oriented parallel to the plurality of bars 421 and to define the corresponding transmitted light as P-ray; and
(ii) to reflect light having a polarization oriented perpendicular to the plurality of bars 421 and to define the corresponding reflected light as S-ray.

The S-ray may be reflected by the reflection sheet 32 at the bottom of the backlight module 30. The S-ray may be reflected from sub-wavelength grating plate 42 to the reflection sheet 32. Then, it is re-reflected back to sub-wavelength grating plate 42. Through this process, the S-ray passes through retardation plate 33 back and forth and it generates a retardation of ½ wavelength which ultimately transforms the S-ray into P-ray that penetrates sub-wavelength grating plate 42. Through the combination of sub-wavelength 42, retardation plate 33 and reflection sheet 32, the non-polarized light provided by light source 40 can be transformed into P-ray, nearly perfectly.

As shown in FIG. 3, a plurality of optical films 44 are disposed over the sub-wavelength grating plate 42. The plurality of optical films 44 reinforce the evenness and brightness of the light provided by backlight module 30. In one embodiment, the plurality of optical films 44 may include a top diffuser, a bottom diffuser, a top brightness enhancement film and a bottom brightness enhancement film.

Figure 1:
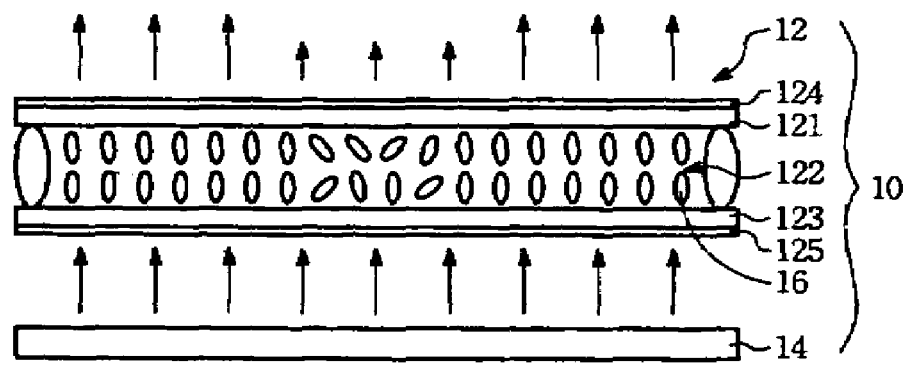
FIG. 1 is an illustration of an LCD according to the prior art.
Figure 2:
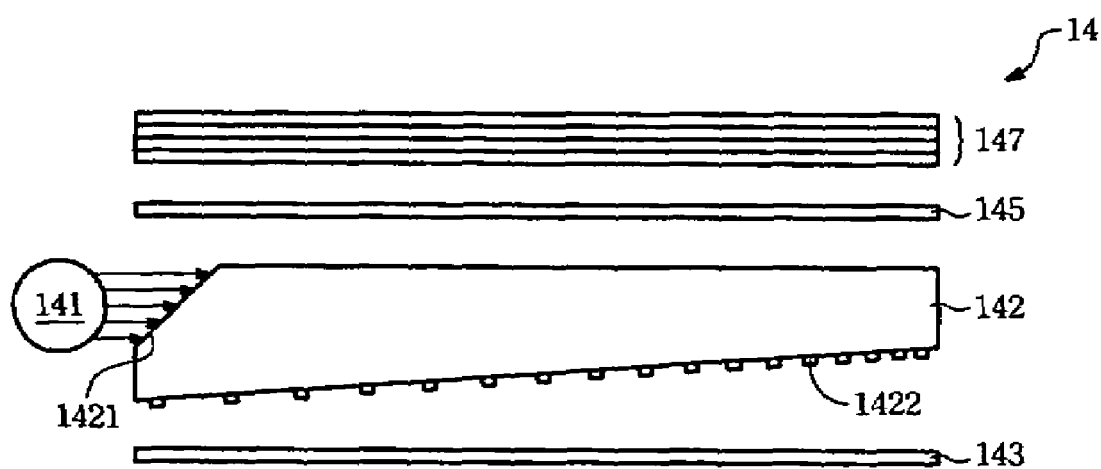
FIG. 2 is an illustration of a backlight module according to the prior art.

Comparing to the related art, backlight module 30 of the present invention comprises sub-wavelength grating plate 42 to substitute polarizers 124 and 125 shown in FIG. 1 or polarizer 145 shown in FIG. 2. In terms of functions, the difference between sub-wavelength grating plate 42 and polarizer is that polarizer absorbs S-ray, yet sub-wavelength grating plate 42 reflects S-ray.

In addition, the present invention enables reflection sheet 32 to operate in coordination with retardation plate 33 so that the S-ray, which is reflected by sub-wavelength grating plate 42, can be transformed into P-ray. When S-ray passes through the ¼ wave plate 34, a ½ wave-length retardation will occur phase difference and thus P-ray is generated. This resolves the lose of light due to the polarizer in the related art.

In some embodiment of the present invention, Moxtek's series products of PPL, PBS or PBF may be selected as sub-wavelength grating plates 42. In another embodiment, some structures corresponding to the plurality of bars 421 are preformed in the mold, such as injection mold, of the light-guide plate 38. This is to form the plurality of bars 421 and light-guide plate 38 integrally. Other than the integrally-formed micro-structures 381 at the bottom surface of light-guide plate 38, upper surface of light-guide plate 38 may remain clear and flat so as to reinforce the jointing of light-guide plate 38 and sub-wavelength grating plate 42.

As to the backlight module 30, retardation plate 33 not only includes said ¼ wave plate 34, but also includes a ½ wave plate 36. Lights provided by backlight module 30 include various wavelengths which may range about 400 nanometer to 700 nanometer. When backlight module 30 equips with only ¼ wave plate 34, P-ray can be generated by transforming S-ray of some wavelength. However, because of the wide range of wavelength within visible light, the transforming efficiency would change depending on different wavelengths. This may cause problems about color shift or display quality decrease.

Figure 4:
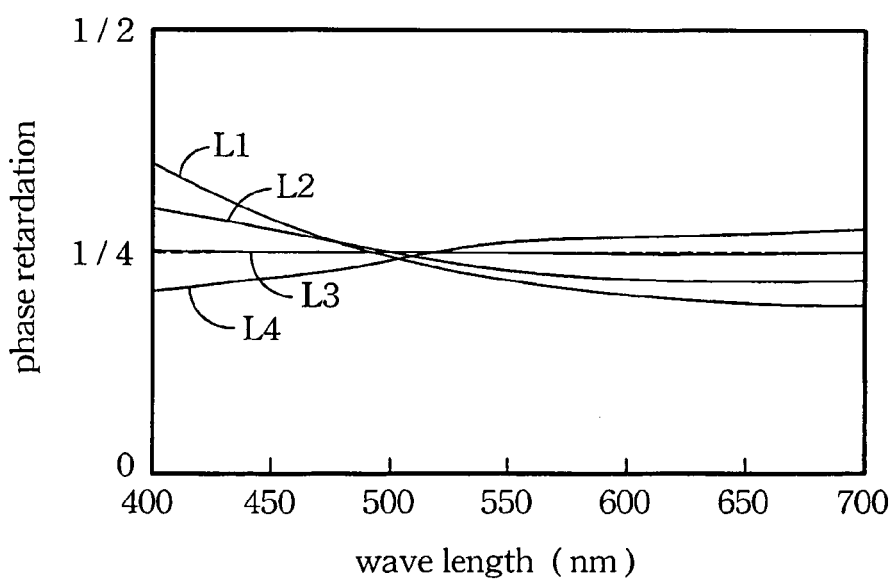
FIG. 4 is a diagram of wavelength versus phase retardation.

Referring to FIG. 4, it is a diagram of wavelength versus phase retardation. Line 1 and Line 2 (shown as L1 and L2) in FIG. 4 represent the phase retardation of the light passing through the ¼ wave plate, which only equips with the ¼ wave plate 34 (shown in FIG. 334) but without the ½ wave plate 36.

Line 1 represents the result of using polycarbonate-made ¼ wave plate. Line 2 represents the result of using polyvinyl alcohol-made ¼ wave plate.

Line 3 and Line 4 (shown as L3 and L4) represent the result of the light passing through ½ wave plate 36 twice and through ¼ wave plate 34 once in the embodiment where one ¼ wave plate 34 and one ½ wave plate 36 (FIG. 3 numeral 34) are both disposed in the backlight module 30.

Line 3 represents the result of using polycarbonate-made ½ wave plate and ¼ wave plate when the included angle of the opposite axes of the two wave plates is about 10 degree.

As for Line 4 (shown as L4), it represents the result of using polycarbonate-made ½ wave plate 36 and ¼ wave plate 34, whereas the included angle of the opposite axes of the two wave plates is about 17.5 degree.

Among all these four lines (L1~L4), it is clear that the embodiments of disposing both ½ wave plate 36 and ¼ wave plate 34 (L3, L4) in backlight module 30 would make the phase difference about ¼ wavelength, which in turn carries out a polarized light interchange more evenly. This scenario happens no matter if it is closer to wavelengths of about 400 nanometer (nearly purple light) or 700 nanometer (nearly red light). The angle between optical axis of ½ wave plate 36 and ¼ wave plate 34 should be between about 9 to 18 degree, preferably, about 9 to 11 degree. As to the embodiments only disposed ½ wave plate 36 (L1, L2), light with wavelength of about 550 nanometer would have a phase difference close to ¼ wavelength. As shown in FIG. 4, the phase difference of L1, with wavelength of about 400 nanometer, reaches ⅜ wavelength. Therefore, the interchanges of polarized states of light of this embodiment would be unevenly distributed. For example, the polarized light interchange of the light with wavelength of about 550 nanometer would be more ideal than the light with wavelength of about 400 nanometer.

Some embodiments of the present invention are introduced as the following.

In backlight module 30, an inclined surface 1421 is no longer disposed on light-guide plate 38 as it is in the related art of backlight module 14 in FIG. 2. As shown in FIG. 3, the design of the flat side, next to light source 40, of light-guide plate 38 makes the production of light-guide plate 38 trouble-free. In addition, the process in putting together light-guide plate 38 and light source 40 is effortless because the jointing of lamp 141 and inclined surface 1421 is waived in the invention.

The plurality of particular inclined surface provided by micro-structures 381 at the bottom of light-guide plate 38 takes place of the inclined surface 1421 at the light-guide plate 142 in the related art of backlight module 14 in FIG. 2. Micro-structures 381 enable the total-reflected light inside light-guide plate 38 to emit out successfully.

Figure 5:
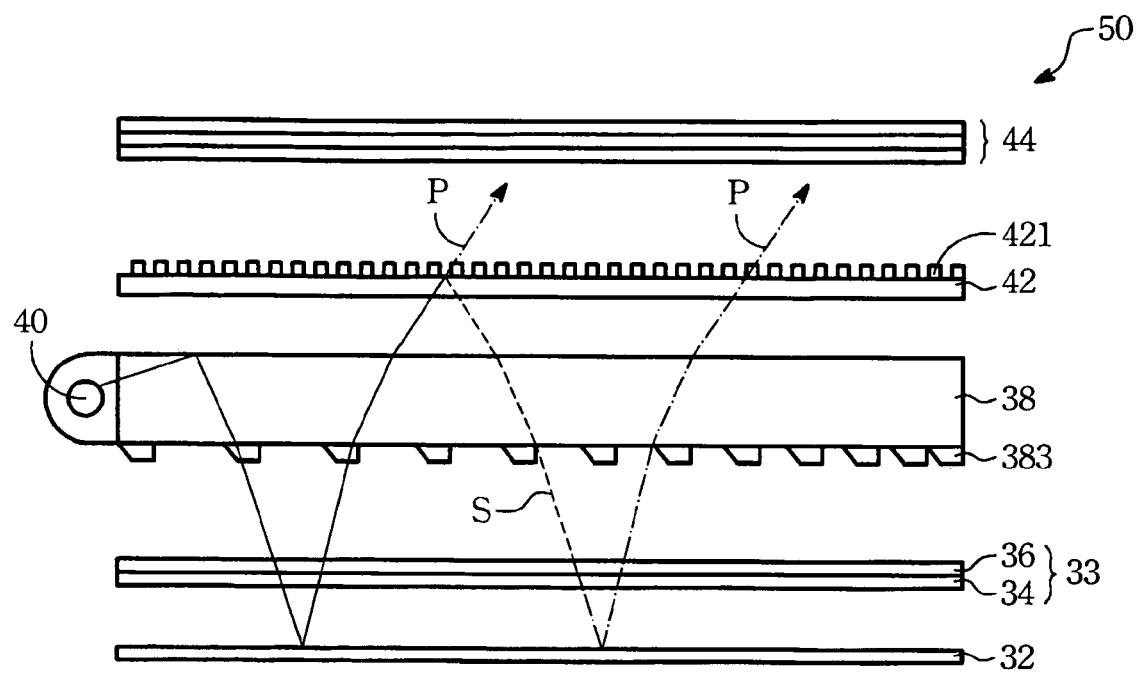
FIG. 5 illustrates another embodiment of the present invention.
Figure 6:
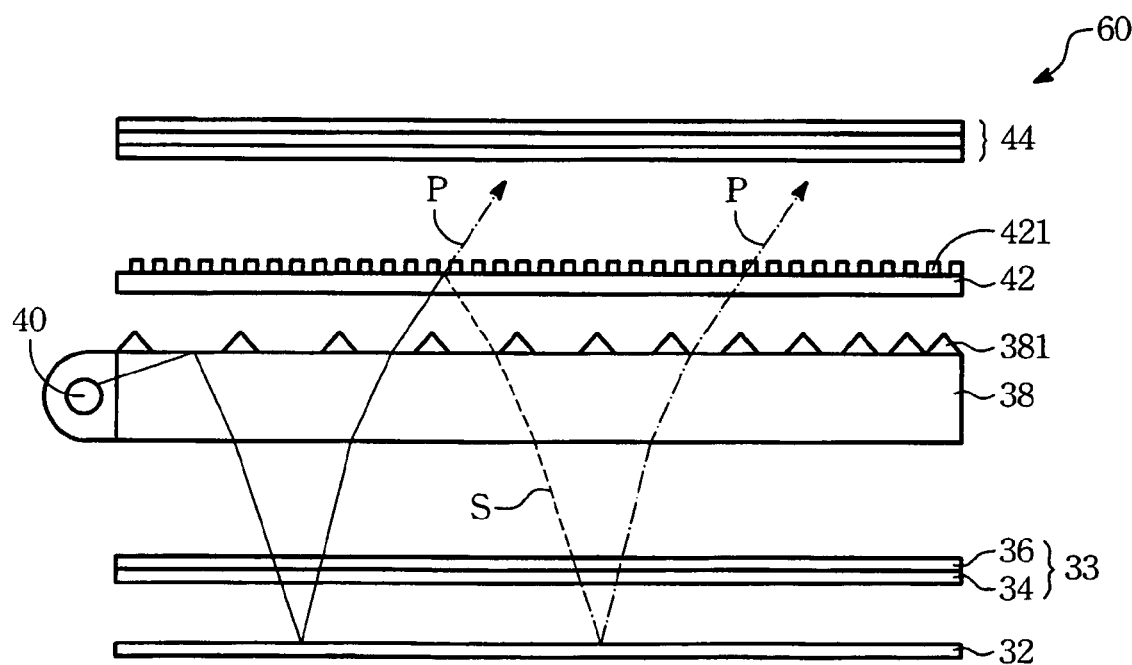
FIG. 6 illustrates another embodiment of the present invention.
Figure 7:
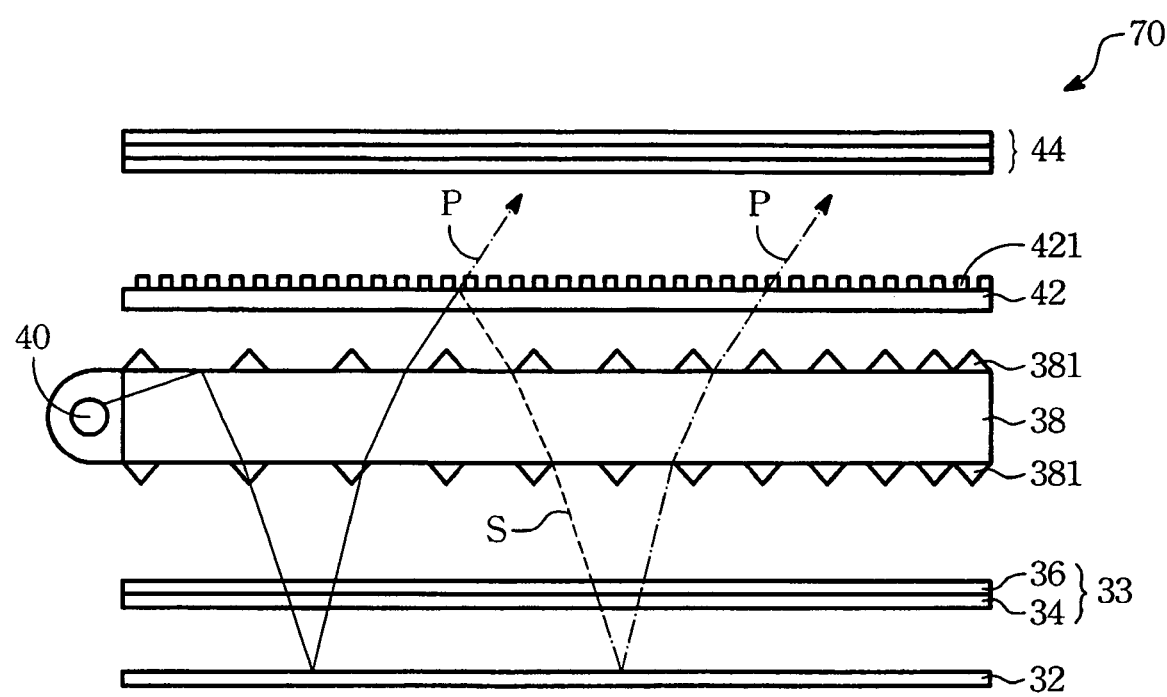
FIG. 7 illustrates still another embodiment of the present invention.

Micro-structures 381 can be V-cut structures shown in FIG. 3, FIG. 6 and FIG. 7 or bumps shown in FIG. 5 with particular inclined surface. The shape could be preformed in the injection mold so that the micro-structures 381 and light-guide plate 38 can be formed integrally. In another embodiment, a V-cut blade may be used on the surface of the light-guide plate 38.

FIG. 3 illustrates the idea of the backlight module 30 of this invention. In reality, all the elements and units in the backlight module 30 of this invention may be disposed into a frame, and the spaces between each elements may be less than what have been shown in FIG. 3. In addition, micro-structures 381 may not only be disposed on the bottom surface of light-guide plate 38, but it may be also disposed on the top surface of light-guide plate 38 in another embodiment demonstration in FIG. 6. Further, micro-structures 381 appear on top and bottom surfaces of light-guide plate 38 in another embodiment in FIG. 7.

To sum up, the present invention provides a backlight module that is capable of interchanging polarized states of lights and improving the low light-utilizing efficiency of related art. By operating the sub-wavelength grating plate in coordination with retardation plate and reflection sheets, the invention successfully makes use of the supposed-to-be-absorbed S-ray. The light generated from the light source is thus being employed more effectively. In addition, disposing the ½ wave plate has enable S-ray to transform evenly into P-ray in the range of visible lights. The present invention also provides a backlight module which is easier to be made than related art. So the present invention is able to adapt on production line immediately.

While the present invention has been particularly shown and described with reference to a preferred embodiment, it will be understood by those skilled in the art that various changes in form and detail may be without departing from the spirit and scope of the present invention.

We claim:

1. A backlight module comprising:
   a light-guide plate having a plurality of micro-structures;
   a sub-wavelength grating plate, disposed over said light-guide plate, having a plurality of bars;
   a light source, disposed at one side of said light-guide plate, for generating
   a substantially unpolarized light having orthogonal P-ray and S-ray, wherein said said sub-wavelength grating plate with said bars (i) to transmit light having a polarization oriented substantially parallel to said bars and to define a transmitted light corresponding to the light as P-ray, and (ii) to reflect light having a polarization oriented substantially perpendicular to said bars and to define a reflected light corresponding to the light as S-ray;
   a retardation plate disposed below said light-guide plate; and
   a reflection plate disposed below said retardation plate.

2. The backlight module of claim 1, wherein the retardation plate comprises at least one ¼ wave-plate and one ½ λ wave-plate.

3. The backlight module of claim 2, wherein the opposite axes of said ¼ wave-plate and said ½ wave-plate form an included angle.

4. The backlight module of claim 3, wherein said included angle ranges from about 9 degree to 18 degree.

5. The backlight module of claim 4, wherein said included angle ranges from about 9 degree to 11 degree.

6. The backlight module of claim 1, wherein said plurality of micro-structures are formed on the bottom surface of said light-guide plate.

7. The backlight module of claim 1, wherein said plurality of micro-structures are formed on the upper surface of said light-guide plate.

8. The backlight module of claim 1, wherein said plurality of micro-structures are V-cut structures.

9. The backlight module of claim 1, wherein said plurality of micro-structures are bumps.

10. The backlight module of claim 1, further comprising a plurality of optical films disposed over said sub-wavelength grating plate.

11. The backlight module of claim 10, wherein said plurality of optical films include a top diffuser, a bottom diffuser, a top brightness enhancement film, and a bottom brightness enhancement film.

12. The backlight module of claim 1, wherein said bars are arranged in a spatial period from about 10 nanometer to 100 nanometer.

13. A backlight module comprising:
   a reflection plate;
   a ¼ wave-plate disposed over said reflection plate;
   a light-guide plate, disposed over said ¼ wave-plate, having a plurality of micro-structures;
   a light source, disposed at one side of said light-guide plate, for generating an unpolarized light propagated in said light-guide plate through total internal reflection and leaving said light-guide plate through said plurality of micro-structures; and
   a sub-wavelength grating plate, disposed over said light-guide plate, having a plurality of bars (i) to transmit light having a polarization oriented parallel to said bars and to define a transmitted light corresponding to the light as P-ray, and (ii) to reflect light having a polarization oriented perpendicular to said bars and to define a reflected light corresponding to the light as S-ray.

14. The backlight module of claim 13, further comprising a ½ wave-plate disposed over said reflection plate.

15. The backlight module of claim 14, wherein the opposite axes of said ¼ wave-plate and said ½ wave-plate form an included angle.

16. The backlight module of claim 15, wherein said included angle ranges from about 9 degree to 18 degree.

17. The backlight module of claim 16, wherein said included angle ranges from about 9 degree to 11 degree.

18. The backlight module of claim 13, wherein said plurality of micro-structures are formed on the bottom surface of said light-guide plate.

19. The backlight module of claim 13, wherein said plurality of micro-structures are formed on the upper surface of said light-guide plate.

20. The backlight module of claim 13, wherein said plurality of micro-structures are V-cut structures.

21. The backlight module of claim 13, wherein said plurality of micro-structures are bumps.

22. The backlight module of claim 13, further comprising a plurality of optical films disposed over said sub-wavelength grating plate.

23. The backlight module of claim 22, wherein said plurality of optical films include a top diffuser, a bottom diffuser, a top brightness enhancement film, and a bottom brightness enhancement film.

* * * * *